United States Patent
Dolan (10) Patent No.: US 7,145,699 B2
(45) Date of Patent: Dec. 5, 2006

(54) SYSTEM AND METHOD FOR DIGITAL DOCUMENT ALIGNMENT

(75) Inventor: John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 900 days.

(21) Appl. No.: 10/274,309

(22) Filed: Oct. 18, 2002

(65) Prior Publication Data

US 2004/0076341 A1   Apr. 22, 2004

Related U.S. Application Data

(63) Continuation-in-part of application No. 09/823,372, filed on Mar. 30, 2001.

(51) Int. Cl.
  H04N 1/387 (2006.01)
  H04N 1/04 (2006.01)
  H04N 1/46 (2006.01)
  G06K 9/36 (2006.01)

(52) U.S. Cl. ............ 358/452; 358/474; 358/537; 382/289

(58) Field of Classification Search ........ 358/452, 358/474, 537, 455; 382/289, 299
See application file for complete search history.

(56) References Cited

U.S. PATENT DOCUMENTS

| 4,511,242 A | 4/1985 | Ashbee et al. |
| 5,001,766 A | 3/1991 | Baird ............ 382/46 |
| 5,091,654 A | 2/1992 | Coy et al. ............ 250/561 |
| 5,153,608 A | 10/1992 | Genovese ............ 346/108 |
| 5,313,311 A | 5/1994 | Brandkamp ............ 358/474 |
| 5,355,420 A | 10/1994 | Bloomberg ............ 382/46 |
| 5,901,253 A * | 5/1999 | Tretter ............ 382/289 |
| 6,005,680 A * | 12/1999 | Luther et al. ............ 358/2.1 |
| 6,430,320 B1 * | 8/2002 | Jia et al. ............ 382/289 |
| 2001/0014183 A1 | 8/2001 | Sansom-Wai ............ 382/289 |
| 2001/0022674 A1 | 9/2001 | Kelly et al. ............ 358/488 |
| 2001/0022675 A1 | 9/2001 | Kelly et al. ............ 358/488 |
| 2002/0044306 A1 | 4/2002 | Mercer ............ 358/474 |
| 2005/0231620 A1 * | 10/2005 | Fraenkel et al. ............ 348/308 |

* cited by examiner

*Primary Examiner*—Jerome Grant
*Assistant Examiner*—Houshang Safaipour
(74) *Attorney, Agent, or Firm*—Law Office of Gerald Maliszewski; Gerald Maliszewski

(57) ABSTRACT

A system and method are provided for aligning a scanned document in a digital scanner. The method comprises: scanning a document to create a matrix of pixel information; averaging pixel intensity information into a first plurality of row-mean buffer elements, where each row strip includes information from a second plurality of column elements; and, averaging pixel information into a third plurality of column-mean buffer elements, where each column strip includes information from a fourth plurality of row elements; comparing adjacent elements of matrix row information to generate a first set of edge positions; comparing adjacent elements of matrix column information to generate a second set of edge positions; generating a rotation angle in response to analyzing the first and second edge positions; and, rotating the scanned document by the rotation angle.

35 Claims, 7 Drawing Sheets

SYSTEM AND METHOD FOR DIGITAL DOCUMENT ALIGNMENT

RELATED APPLICATIONS

This application is a continuation-in-part of a pending application entitled, ROBUST DOCUMENT BOUNDARY DETERMINATION, invented by John E. Dolan and John Charles Dairymple, Ser. No. 09/823,372, filed Mar. 30, 2001.

BACKGROUND OF THE INVENTION

1. Field of the Invention

This invention generally relates to document copying, scanning, and reproduction and, more particularly, to a system and method for correctly aligning a document during a digital document scanning process.

2. Description of the Related Art

As used herein, the term digital scanning, or scanning refers to copying, scanning, and document archiving using a digital process, especially using OCR technology. While scanning, it is often desirable to align the original document with the coordinate system of the scanner to reduce classification errors. Indeed, there are a variety of conventional scanners that employ various specialized apparatuses, such as automatic document feeders, guides, arms, etc., to physically align the original in order to avoid such problems.

However, it is not unusual for documents to be positioned manually on the scanner platen as well. This is especially true if the original is bound, e.g., a book or a journal. If the user is not careful in positioning the original or in closing the cover, the original may become misaligned relative to the scanning coordinate system. In the parlance of the industry, such rotational misalignment of a document is often referred to as skew.

Figure 1:
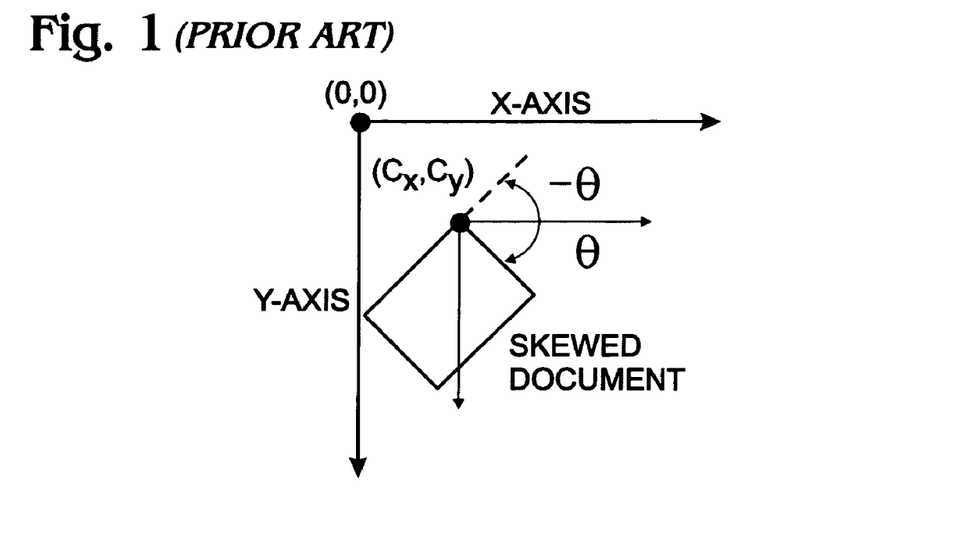
FIG. 1 is a plan view of a document scanner and document coordinate systems (prior art).

FIG. 1 is a plan view of a document scanner and document coordinate systems (prior art). Note that the terms scanning coordinate system or scanner coordinate system refer to the 2-dimensional imaging coordinate system imposed on the digital image by the scanning process itself. Typically, one axis corresponds to the pixel readout along the scan bar (called x-axis for convenience). The other orthogonal axis corresponds to the direction of travel of the scan bar (called y-axis for convenience). The image of the original document has its own local coordinate system (for convenience referred to as the document coordinate system), which is defined relative to the scanner coordinate system.

As mentioned above, many scanners avoid the problem of skew altogether by employing special mechanisms like automatic document feeders, guides, or arms to physically align the document with the scanner coordinate system. However, the added processes reduce reliability and document throughput. Software solutions, on the other hand, rely on detecting the bounding contour of the document in order to determine the amount of skew. They frequently utilize special patterned or colored backings to facilitate the task of boundary detection, which can sometimes be "seen" through the paper being scanned. Generally, these solutions and manipulations add to the cost of the scanning system. Further, many software processes require extensive scanner device memory.

It would be advantageous if a scanned document could be deskewed without mechanical means, or without a specially patterned backing.

It would be advantageous if a scanned document could be deskewed with a simple and effective software process that minimized the use of memory.

SUMMARY OF THE INVENTION

The present invention describes a method for automatically aligning the digital image of a possibly misaligned original with the coordinate system of the scanner. The present invention method does not rely on any special apparatus or setup other than the ability to scan an image of the document and the surrounding platen area, which is within the normal scanning capability of a scanner/copier. From this image, which may be the actual copy scan or a preview scan, the method automatically computes the angle of skew of the input document. It does so by exploiting the slight shadow cast by the document onto the platen backing to locate points along the boundary of the document, and from these it determines the minimum angle of rotation required to rectify the document with the scanner axes.

Given this angle and a center of rotation it is possible to transform the image of the skewed document to standard position. That is, to be aligned with the scanner coordinate system and justified with the scanner origin.

Figure 2A:
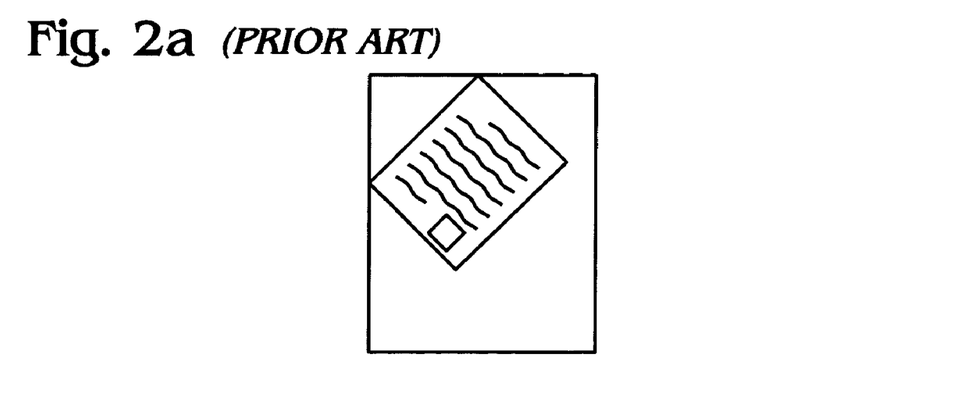
FIGS. 2a and 2b illustrate a skewed document and a deskewed document, respectively (prior art).
Figure 2B:
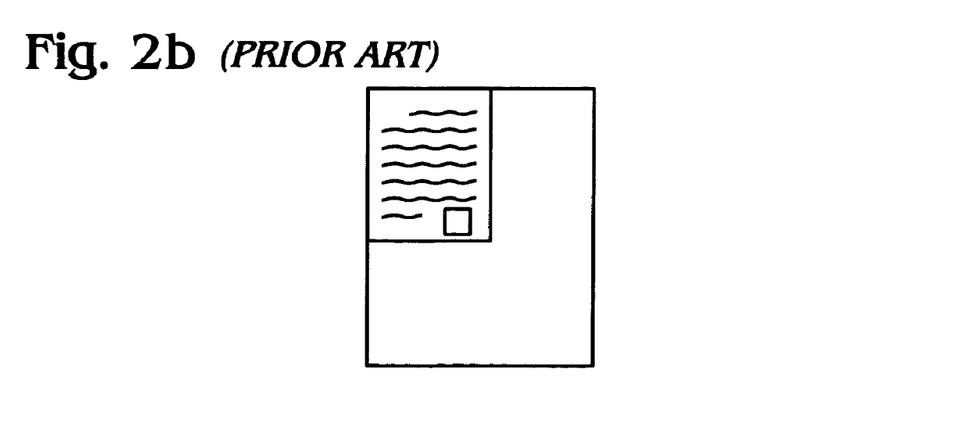

FIGS. 2a and 2b illustrate a skewed document and a deskewed document, respectively (prior art). As seen in FIG. 2a, the document is skewed at roughly 33°. FIG. 2b illustrates the document of FIG. 2a with the skew removed. With skew removed, the document is presumably less prone to OCR classification errors, because text characters have more predictable signatures when they are aligned with the scanner axes. Moreover, since it is justified with the scanner origin, the document is more efficient to process and store— the document image typically occupies fewer pixels (both horizontally and vertically) than the skewed version.

This spatial efficiency is apparent from the example in FIGS. 2a and 2b, where the rectified document in FIG. 2b is w=414 pixels wide and $\lambda$=455 pixels long. On the other hand, the skewed version in FIG. 2a covers w'=w cos $\theta$+$\lambda$ sin $\theta$ in width and $\lambda$'=w sin $\theta$+$\lambda$ cos $\theta$ in length. Under the given skew of 33°, these dimensions are w'=595 pixels and $\lambda$'=607 pixels.

Accordingly, a method is provided for aligning a scanned document in a digital scanner. The method comprises: scanning a document to create a matrix of pixel information; comparing adjacent elements of matrix row information to generate a first set of edge positions; comparing adjacent elements of matrix column information to generate a second set of edge positions; generating a rotation angle in response to analyzing the first and second edge positions; and, rotating the scanned document by the rotation angle.

Some aspects of the method further comprise: averaging pixel intensity information into a first plurality of row-mean buffer elements, where each row strip includes information from a second plurality of column elements; and, averaging pixel information into a third plurality of column-mean buffer elements, where each column strip includes information from a fourth plurality of row elements. Then, comparing adjacent elements of matrix row information to generate a first set of edge positions includes comparing adjacent column elements in the row-mean buffer elements to generate a first set of edge positions. Likewise, comparing adjacent elements of matrix column information to generate a second set of edge positions includes comparing adjacent row elements in the column-mean buffer elements to generate a second set of edge positions.

The method further comprises: establishing an edge threshold. Then, comparing adjacent elements in the row-mean buffer elements to generate a first set of edge positions includes subtracting a first column element in the row-mean buffer element from an adjacent second column element in the row-mean buffer element. If the difference exceeds the threshold, the first column element is defined as a first edge position. Comparing adjacent elements in the column-mean buffer element to generate a second set of edge positions includes subtracting a first row element in the column-mean buffer element from an adjacent second row element in the column-mean buffer element. If the difference exceeds the threshold, the first row element is defined as a second edge position.

Additional details of the above-described method and a digital scanner system for aligning a scanned document with a predetermined axis are provided below.

DETAILED DESCRIPTION OF THE PREFERRED EMBODIMENTS

Figure 3:
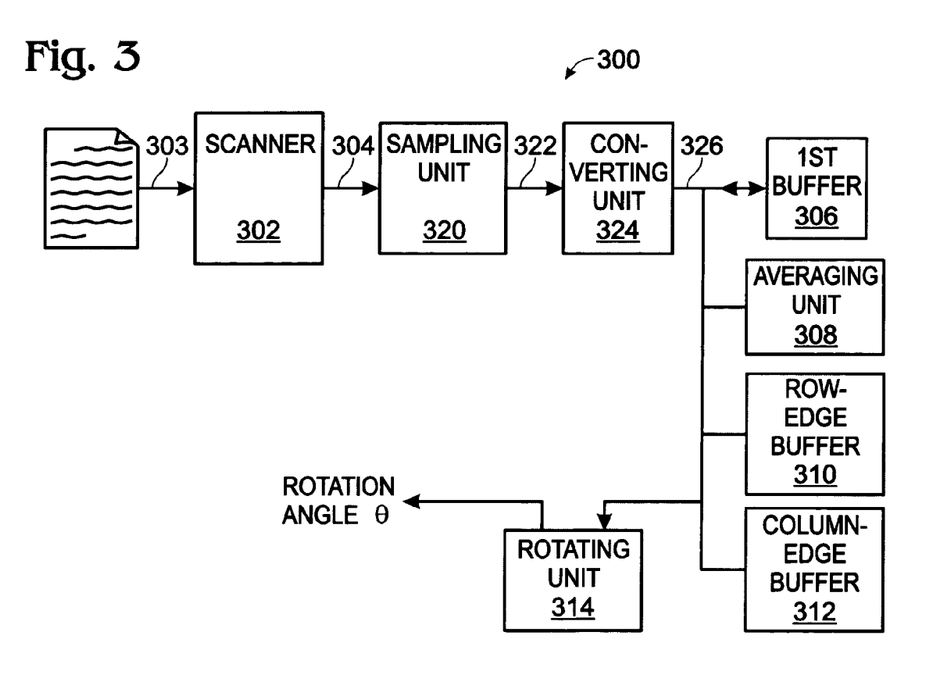
FIG. 3 is a schematic block diagram of the present invention digital scanner system for aligning a scanned document with a predetermined axis.

FIG. 3 is a schematic block diagram of the present invention digital scanner system for aligning a scanned document with a predetermined axis. The system 300 comprises a digital scanner 302 having an interface 303 to scan a supplied document and an output on line 304 to supply a matrix of pixel information. A first buffer 306 has a port connected to the scanner output on line 304 to store the matrix of pixel information. An averaging unit 308 has a port connected to the buffer port. The averaging unit 308 compares adjacent elements of matrix row information to generate a first set of edge positions, and compares adjacent elements of matrix column information to generate a second set of edge positions.

A row-edge buffer 310 has a port connected to the averaging unit 308 to accept the first set of edge positions. A column-edge buffer 312 has a port connected to the averaging unit 308 to accept the second set of edge positions. A rotating unit 314 has a port connected to the row-edge buffer 310 and column-edge buffer 312 to generate a rotation angle, in response to analyzing the first and second edge positions. The rotation angle is used for aligning the matrix of pixel information in the first buffer with a predetermined axis.

It should be understood that many of the above-mentioned system elements are realized as software routines and identified by function. For example, the averaging unit can be realized as a Matlab or C-code routine that performs an averaging function. It should also be realized that many of these elements are functionally combined into a common element or closely nested software routines. Likewise, the above-named buffers may all reside in a common memory.

The averaging unit 308 averages pixel intensity information into a first plurality of row-mean buffers, where each row includes information from a second plurality of column elements. Likewise, the averaging unit 308 averages pixel information into a third plurality of column-mean buffer elements, where each column includes information from a fourth plurality of row elements. The averaging unit 308 compares adjacent column elements in the row-mean buffer elements to generate a first set of edge positions. Adjacent row elements are also compared in the column-mean buffer elements to generate a second set of edge positions.

The averaging unit 308 averages pixel intensity information into row-mean buffer elements, where each column element has a fifth plurality of pixels. Likewise, the averaging unit 308 averages pixel intensity information into column-mean buffer elements, where each row element has a sixth plurality of pixels.

Figure 4A:
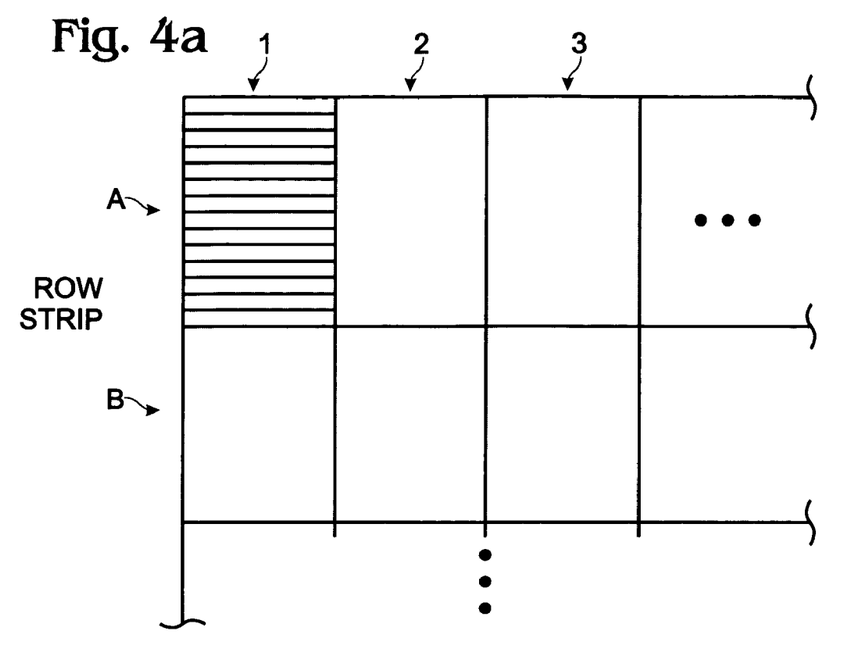
FIGS. 4a and 4b are diagrams depicting the averaging of pixel intensity information into row-mean and column-mean buffers, respectively.

FIGS. 4a and 4b are diagrams depicting the averaging of pixel intensity information into row-mean and column-mean buffers, respectively. In FIG. 4a row strips A and B are specifically shown. The data in each row strip is converted into a corresponding row-mean buffer. As seen in row strip A, each row strip includes column elements. Column elements 1, 2, and 3 are specifically shown. As shown, column element 1 includes 16 (rows of) pixels. In many aspects, the fifth plurality is equal to 32. However, the present invention fifth plurality is not limited to any particular number of pixels per column element. In this example, every row strip would include the same number of column elements, and every column element would include the same number of pixels.

Figure 4B:
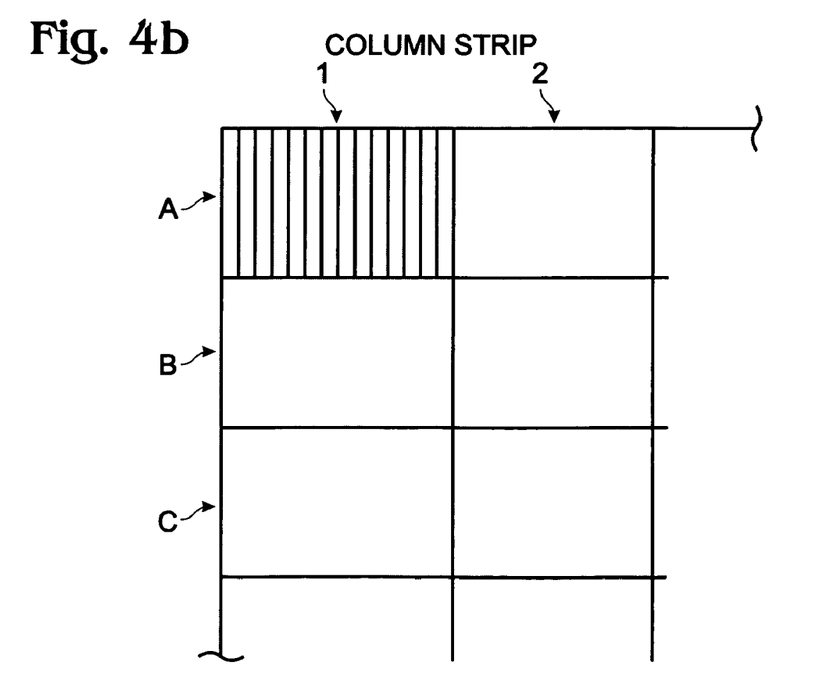

In FIG. 4b column strips 1 and 2 are specifically shown. Again, the column strips correspond to column-mean buffers. As seen in column strip 1, each column strip includes row elements. Row elements A, B, and C are specifically shown. As shown, row element A includes 16 (columns of) pixels. In many aspects, the sixth plurality is equal to 32. However, the present invention sixth plurality is not limited to any particular number of pixels per row element. In this example, every column strip would include the same number of row elements, and every row element would include the same number of pixels.

The averaging unit establishes an edge threshold, or difference for use in defining a probable document edge. The averaging unit generates a first set of edge positions by subtracting a first column element in the row-mean buffer element from an adjacent second column element in the row-mean buffer element. If the difference exceeds the threshold, the averaging circuit defines the first column element as a first edge position. That is, the averaging unit compares adjacent column elements in each row-mean buffer. When the difference between adjacent column elements is great, a document edge is assumed. The collection of greatly different adjacent column elements from all the row-mean buffers defines a first set of edge positions, one of the edges of the scanned document. Since only the edge positions are saved, the use of memory is minimized.

Likewise, the averaging unit generates a second set of edge positions by subtracting a first row element in the column-mean buffer element from an adjacent second row element in the column-mean buffer element. If the difference exceeds the threshold, the averaging unit defines the first row element as a second edge position. Again, the collection of greatly different adjacent row elements from all the column-mean buffers defines a second set of edge positions, another edge of the scanned document.

In some aspects of the system, the averaging unit examines neighboring elements for each edge position in the first and second sets of edge positions. If the neighboring elements are not edge positions, the edge position is eliminated, based on the assumption that it must be noise. Spurious noise can make the calculation of difference vectors, and their resulting angles, difficult to measure.

The rotating unit calculates a difference vector between edge positions in adjacent row-edge buffer elements. The rotating unit also calculating a difference vector between edge positions in adjacent column-edge buffer elements. The rotating unit derives a quantized angle from each difference vector, and uses the most frequently occurring of the derived angles to generate the rotation angle.

In some aspects of the system, the rotating unit limits the rotation angle to a range of 90 degrees. More specifically, the rotating unit constrains the range of acceptable derived angles in the range between −45 degrees and +45 degrees. If a derived angle ($\theta$) is greater than +45 degrees, the rotating unit creates an effective derived angle ($\theta 1$) as follows:

($\theta 1$)=90 degrees−($\theta$).

If a derived angle ($\theta$) is less than −45 degrees, the rotating unit creates an effective derived angle ($\theta 1$) as follows:

($\theta 1$)=−(90 degrees+($\theta$)).

The rotating unit uses the most frequently occurring of the effective derived angles to generate the rotation angle. The second most frequently occurring derived angles are modified by 90 degrees, to generate the same rotation angle. The above-mentioned convention is based upon the assumption that the scanned document is a rectangular piece of paper. If the vectors collected along the long side of the paper are used to (directly) determine the angle of rotation for example, the vectors collected along the short side of the paper, orthogonal to the long side, should generate the same rotation angle after being modified 90 degrees.

Further, the rotating unit measures the difference between adjacent edge buffer elements, converts the difference to a folded offset angle, and converts the folded offset angle to a derived angle. The present invention's use of folded offset angles is important in reducing the overall memory requirements of the scanner. As a result, the present invention aligning process can be used with relatively low-cost scanners. The rotating unit also measures the sign of the difference vector and applies the difference vector sign to the derived angle.

The rotating unit locates the center of rotation in response to analyzing the first and second edge positions. More specifically, the rotating unit locates first x and first y coordinates for a left-most leading edge, and locates second x and second y coordinates for a top-most leading edge. If the angle of rotation is negative, the rotating unit uses the first y and x coordinates as the center of rotation. If the angle of rotation is positive, the rotating unit uses the second y and x coordinates as the center of rotation.

The rotating unit locates the first x and first y coordinates for the left-most edge by analyzing the row-edge buffer elements to locate the row-edge buffer element associated with the left-most edge. Likewise, the rotating unit locates second x and second y coordinates for the top-most leading edge by analyzing the column-edge buffer elements to locate the column-edge buffer element associated with the top-most edge.

The rotating unit generates the first set of edge positions by locating a first row-mean buffer element with a left-most leading edge to determine a first y coordinate. The rotating unit locates the column element in the first row-mean buffer element corresponding to the left-most leading edge to determine a first x coordinate. Likewise, the rotating unit generates the second set of edge positions by locating a first column-mean buffer element with a top-most leading edge to determine a second x coordinate. The rotating unit locates the row element in the first column-mean buffer element corresponding to the top-most leading edge to determine a second y coordinate. Note that the bottom-most and/or right-most edges could be used to provide equivalent results.

In some aspects of the system, the averaging unit averages pixel information from a subset of the fifth plurality of row pixels in each row-mean buffer element. For example, as seen in FIG. 4a there are 16 pixels in each column element. The averaging unit may choose to use a subset of the 16 pixels, 8 pixels for example. Likewise, the averaging unit averages pixel information from a subset of the sixth plurality of column pixels in each column-mean buffer element.

Returning to FIG. 3, some aspects of the system 300 further comprise a sampling unit 320 connected to the output of the scanner 302 on line 304 to accept pixel information and an output connected to the first buffer 306 on line 322 to supply down-sampled pixel data, to reduce the total number of pixels stored in the first buffer 306.

Other aspects of the system 300 include a converting unit 324 having an input connected to the scanner output on line 304 and an output on line 326 connected to the first buffer 306 to supply pixel color information converted to pixel grayscale information. Note that the use of either the sampling unit 320 or the converting unit 324 is optional. Further, the system need not use the sampling unit 320 and converting unit 324 in combination.

Functional Description

The present invention is a document boundary detection process that is especially advantageous for use with scanning devices that have a limited memory. The basic idea is to compute the edge buffers and eliminate spurious noise points. The present invention scans the row and column edge buffers and records the leading and trailing edges in each row (and column) strip. For each successive pair of leading edges in adjacent rows (columns), a difference vector is computed, and likewise for corresponding pairs of trailing edges. Each vector is histogrammed by angle and the maximally occurring angle is used to index a rotation matrix corresponding to the desired rectifying transformation.

The center of rotation is determined by locating the corners of the document from the computed set of extreme edges. The top-most corner is chosen for positive angles of rotation and the left-most corner is chosen for negative angles of rotation. These choices entail the minimum clipping of the document data under rotation. The computed rotation center also provides the translation component required to justify the document image with the scanner origin. FIG. 2a illustrates the arrangement of scanner and document coordinate systems for positive skew angle $\theta$ and center of rotation (cx, cy).

A more detailed example of the present invention edge detection process follows:

1. Compute statistics and edge buffers and remove noisy edges:

a) Down-sample the resulting data—Down sampling the image to 75×75 dpi brings the input data to a consistent resolution. For example, a 1×4 box filter average in the horizontal direction and a 2 tap IIR filter in the vertical direction take 300×150 dpi input down to 75×75 dpi. Other resolutions can be used, but 75×75 dpi produces good results and is sufficiently compact.

b) Convert RGB pixels to Y—Compute the Y value (e.g., Y=0.3 R+0.59 G+0.11 B) at each pixel. Optionally, stretch the predicted range of document boundary edges (e.g., pixel values in the range 190–220 are stretched to the range 170–240 by applying an S-curve). The optimal range of values can be established empirically. This stretch increases the robustness of the edge detection process by increasing differences in pixel values in the range of likely document edge values and by attenuating edge magnitudes in the range of the scanner cover and other data such as text. Note that the down-sampling and grayscale conversion steps are optional and may be performed to simplify the following computations.

c) Compute the 28 row and 20 column statistics buffers—Divide up the resulting image into 32-pixel high row strips (typically a maximum of 28) and 32-pixel wide column strips (typically a maximum of 20). For each strip select a set of contiguous rows (or columns), e.g., 8, 16, or 32 rows. In this example, 8-element sub-strips are discussed, but this in no way limits the invention. Compute the transverse average for each such sub-strip and store in a corresponding statistics buffer. For example, each 8-row sub-strip is 640 columns wide. Compute the mean value for each 8-element column and store in the corresponding row- mean buffer—there are 28 such 640 element row-mean buffers. Similarly, compute the column sub-strip mean values for each 8-element row and store in the corresponding column-mean buffer—there are 20 such 896 element column-mean buffers.

Again, the exact number and lengths of the buffers depend on the size of the scanner platen (here assumed to be A4/US letter), and these buffer sizes can easily be changed to accommodate different platen sizes. The present invention, however, is not limited to any particular image shape or paper size.

d) Detect edges in the row and column statistics buffers and record these at the corresponding positions of the row and column edge buffers respectively—Using a local 1 D $1^{st}$ difference operator, mark as edges all points whose magnitude difference is above threshold (e.g., points whose measured local difference along the row (or column) buffer is greater than 5 are considered edges). For example, at each detected row edge location record a "1" at the corresponding position of the row edge buffer; otherwise, record a "0". Likewise, record column edges in the column edge buffer. Note that since edge detection operates on a single row or column at a time, the statistics buffers can be systematically overwritten—thus saving space.

e) Perform morphological test to identify and erase noise points—At each edge point, examine neighbors, e.g., the northwest, north, northeast, southwest, south, and southeast neighbors. If none of these is an edge point, then the current edge is considered noise and is erased from the buffer.

The idea is that noise points are often spatially isolated and are therefore unlikely to have transverse spatial support (i.e. neighbors in adjacent rows/columns that are also edges). Document boundaries typically have extended spatial extent and are, therefore, likely to have transverse spatial support.

2. Measure the angle of rotation for the document:

a) Compute leading and trailing edges—In each row buffer, locate the leftmost and rightmost edges by direct inspection. Record the buffer positions of each of these. Likewise in each column buffer, locate the top-most and bottom-most edges and record their buffer positions.

b) Compute the difference vectors between neighboring row edges—With the buffer construction described in Step 1c, for adjacent row buffers r and r+1, dy=32. Let x0 equal the buffer position of the leading edge in row r, and let x1 equal the buffer position of the leading edge in row r+1. (Note that x0 and x1 are defined in equivalent fashion for the trailing edges of row r and r+1). Then dx=x1−x0; and the corresponding angle of this difference vector is θ=a tan(dx/dy). Because the minimum angle of rotation is sought, the angle is constrained to: −45°≦45°. Thus, for θ>π/4, θ=π/2−θ. Likewise, for θ<−π/4, θ=−(θ+π/2).

c) Compute the difference vectors between neighboring column edges—For adjacent column buffers c and c+1, dx=32. Let y0 equal the buffer position of the leading edge in column c, and let y1 equal the buffer position of the leading edge in column c+1. (Note that y0 and y1 are defined in equivalent fashion for the trailing edges of column c and c+1.) Then, dy=y1−y0; and the corresponding angle of this difference vector is θ=a tan(dx/dy). Because the minimum angle of rotation is sought, the angle is constrained to: −45°≦45°. Thus, for θ>π/4, θ=π/2−θ. Likewise, for θ<−π/4, θ=−(θ+π/2).

d) Histogram the resulting angles and select the mode as the rotation angle—Note that the complementary formulations of θ in Steps 2b and 2c cause measured row and column angles to be superimposed. Further, the folding of large angles means that the angles measured on each of four boundaries of a typical document will be concentrated in the range [−45° . . . 45°]. Therefore, the maximally occurring angle can be reliably taken as the angle of rotation for the document.

With respect to efficiency, the folding of the angles that occurs in Steps 2b and 2c can be efficiently realized by a lookup table that uses each computed offset (dx in Step 2b and dy in Step 2c) to index a folded version of itself. Thus, offsets are constrained to the range [−32 . . . 32], which is equivalent to constraining angles to the range [−45° . . . 45°]. A table of 2048 positive offsets has been used; the sign is recovered from the original offset. Note that the range of −32 to 32 is related to the use of a buffer with 32 elements. However, the invention can be enabled with different a different number of buffer elements. For example, if the buffer includes 16 elements, the offsets would be constrained to the range of −16 to 16. The present invention is not limited to any particular number of elements or any particular range of constraint.

Figure 5A:
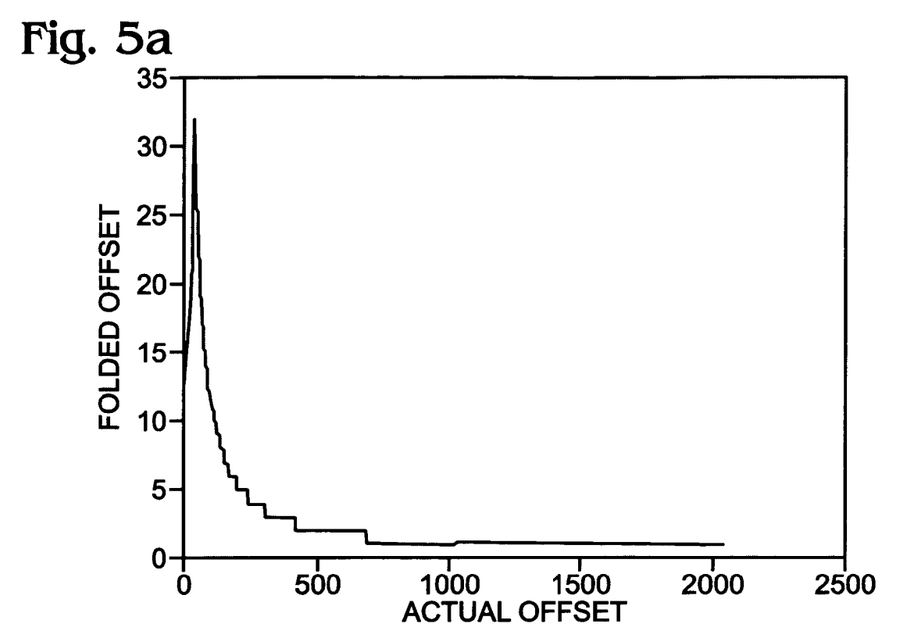
FIGS. 5a and 5b illustrate folded angle tables.
Figure 5B:
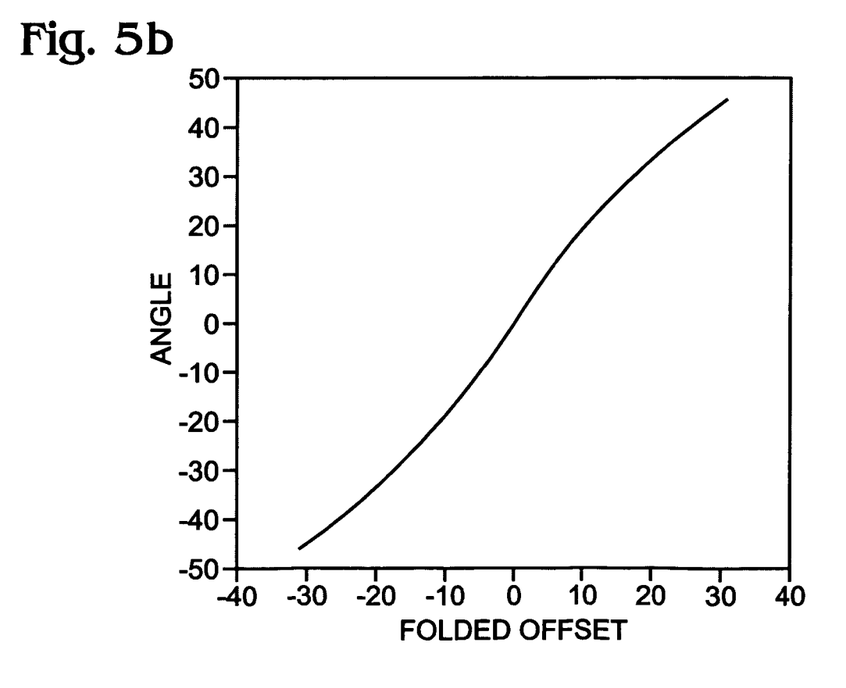

FIGS. 5a and 5b illustrate folded angle tables. In FIG. 5a, inputs in the range from [0 . . . 2048] produce outputs in the range [0 . . . 32]. Inputs above 2048 all map to 0. When combined with the sign information, the output ranges between [−32 . . . 32]. In other aspects of the invention, the computations are simplified by constraining the range to 33 [0 . . . 32], and the sign is added at the end of the computation. The maximally occurring folded offset can then be used to directly index a 65 element lookup table of 2D rotation matrices corresponding to the equivalent angles. The mapping from offsets to rotation angles is shown in FIG. 5b. One further note: because rotations are unitary transformations, scaled integers are used to represent the real-valued entries of these matrices.

3. Locate the center of rotation:

Use either of two methods to locate the center of rotation. The first operates on the leading and trailing edge lists. The second operates on-the-fly on the 75×75 dpi Y-data generated in Step 1b. Thus, either:

a) Locate the center of rotation using the leading and trailing edges lists—Search the column leading edges lists to find the minimum value. This is the y-coordinate of the document's top-most corner. The x-coordinate is the list index of this value multiplied by the strip width of 32.

Likewise, search the row leading edges lists to find the minimum value. This is the x-coordinate of the document's left-most corner. The y-coordinate is the list index of this value multiplied by the strip width of 32. The center of rotation is taken as the top-most corner for positive angles of rotation (as computed in Step 2); it is the left-most corner for negative angles of rotation; OR, b) Locate the center of rotation using the 75×75 dpi Y-data—Perform edge detection on-the-fly on the 75×75 dpi Y-data as it is generated in Step 1b. Maintain the coordinates of the top-most edge encountered—i.e., the edge with the minimum y-coordinate. Likewise, maintain the coordinates of the left-most edge encountered—i.e., the edge with the minimum x-coordinate. The center of rotation is taken as the coordinates of the top-most edge for positive angles of rotation (as computed in Step 2); it is the coordinates of left-most edge for negative angles of rotation.

Figure 6A:
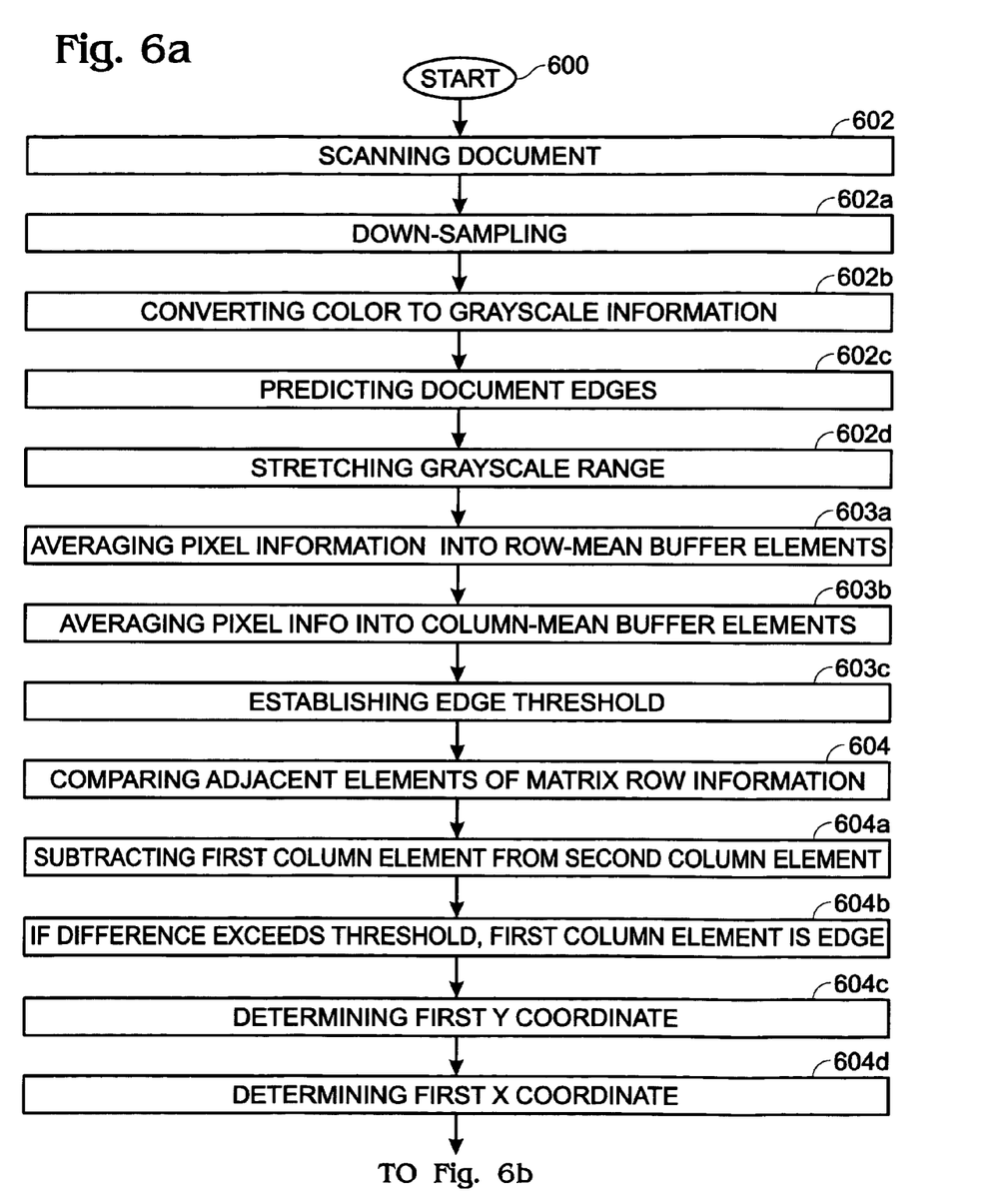
FIGS. 6a through 6c are flowcharts illustrating the present invention method for aligning a scanned document in a digital scanner.
Figure 6B:
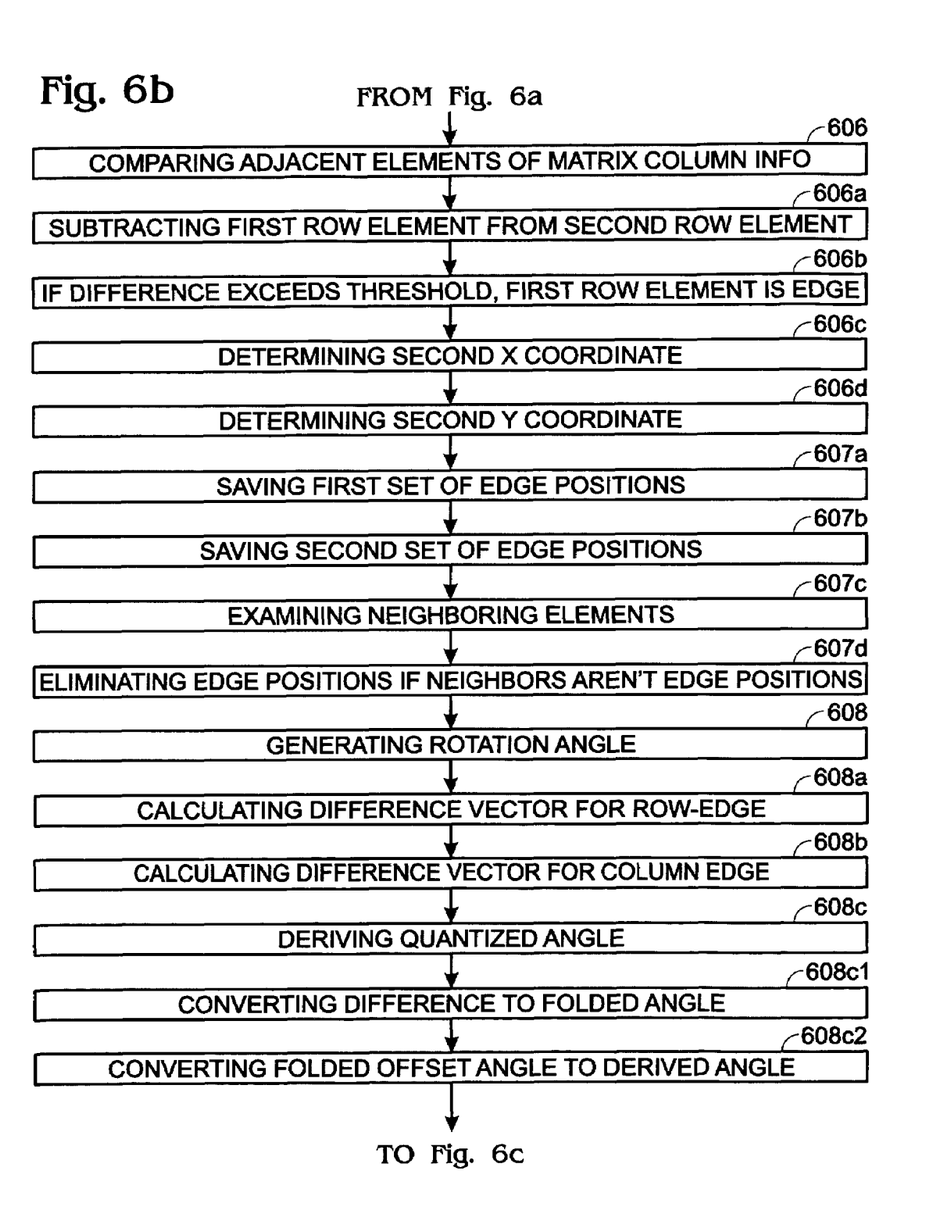
Figure 6C:
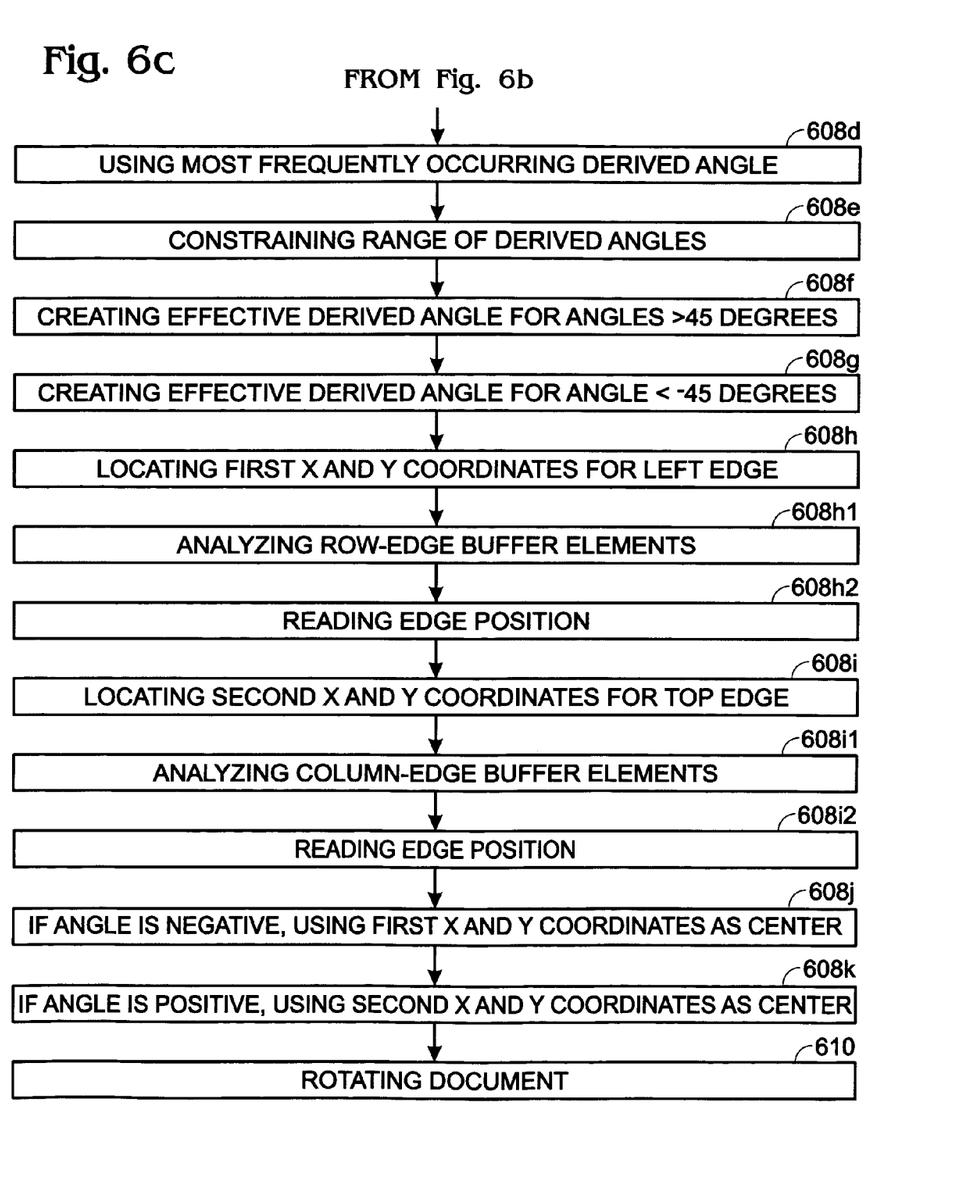

FIGS. 6a through 6c are flowcharts illustrating the present invention method for aligning a scanned document in a digital scanner. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600.

Step 602 scans a document to create a matrix of pixel information. Step 604 compares adjacent elements of matrix row information to generate a first set of edge positions. Step 606 compares adjacent elements of matrix column information to generate a second set of edge positions. Step 608 generates a rotation angle in response to analyzing the first and second edge positions. Step 610 rotates the scanned document by the rotation angle.

Some aspects of the method include further steps. Step 603a averages pixel intensity information into a first plurality of row-mean buffer elements, where each row strip (see FIG. 4a) includes information from a second plurality of column elements. Step 603b averages pixel information into a third plurality of column-mean buffer elements, where each column strip (see FIG. 4b) includes information from a fourth plurality of row elements. Then, comparing adjacent elements of matrix row information to generate a first set of edge positions in Step 604 includes comparing adjacent column elements in the row-mean buffer elements to generate a first set of edge positions. Likewise, comparing adjacent elements of matrix column information to generate a second set of edge positions in Step 606 includes comparing adjacent row elements in the column-mean buffer elements to generate a second set of edge positions.

In some aspects, averaging pixel intensity information into row-mean buffer elements in Step 603a includes each column element having a fifth plurality of pixels. Averaging pixel intensity information into column-mean buffer elements in Step 603b includes each row element having a sixth plurality of pixels.

In some aspects, averaging pixel intensity information into row-mean buffer elements in Step 603a includes averaging pixel information from a subset of the fifth plurality of row pixels in each row-mean buffer element. Likewise, averaging pixel intensity information into column-mean buffer elements in Step 603b includes averaging pixel information from a subset of the sixth plurality of column pixels in each column-mean buffer element. Typically, but not always, the subset consists of consecutive pixels.

Some aspects of the method include a further step. Step 603c establishes an edge threshold. Then, comparing adjacent elements in the row-mean buffer elements to generate a first set of edge positions in Step 604 includes substeps. Step 604a subtracts a first column element in the row-mean buffer element from an adjacent second column element in the row-mean buffer element. Step 604b defines the first column element as a first edge position, if the difference exceeds the threshold.

Likewise, comparing adjacent elements in the column-mean buffer element to generate a second set of edge positions in Step 606 includes substeps. Step 606a subtracts a first row element in the column-mean buffer element from an adjacent second row element in the column-mean buffer element. Step 606b defines the first row element as a second edge position, if the difference exceeds the threshold. In some aspects a Step 607a saves the first set of edge positions as binary information in a row-edge buffer with a plurality of elements, and a Step 607b saves the second set of edge positions as binary information in a column-edge buffer with a plurality of elements.

In some aspects of the method, Step 607c examines neighboring elements for each of the edge positions from the first and second set of edge positions. Step 607d eliminates the edge positions if the neighboring elements are not edge positions, based on the assumption that they are noise. That is, edge positions are assumed to be neighboring other edge positions.

In other aspects, generating a rotation angle in response to analyzing the first and second edge positions in Step 608 includes substeps. Step 608a calculates a difference vector between edge positions in adjacent row-edge buffer elements. Step 608b calculates a difference vector between edge positions in adjacent column-edge buffer elements. Step 608c derives a quantized angle from each difference vector. Step 608d uses the most frequently occurring of the derived angles to generate the rotation angle.

In some aspects of the method, generating a rotation angle in response to analyzing the first and second edge positions in Step 608 includes limiting the rotation angle to a range of 90 degrees. Limiting the rotation angle to a range of 90 degrees includes substeps. Step 608e constrains the range of acceptable derived angles in the range between −45 degrees and +45 degrees. Step 608f, if a derived angle ($\theta$) is greater than +45 degrees, creates an effective derived angle ($\theta 1$) as follows:

($\theta 1$)=90 degrees−($\theta$).

Step 608g, if a derived angle ($\theta$) is less than −45 degrees, creates an effective derived angle ($\theta 1$) as follows:

($\theta 1$)=−(90 degrees+($\theta$)).

Then, using the most frequently occurring of the derived angles to generate the rotation angle in Step 608d includes using the most frequently occurring of the effective derived angles.

In some aspects, Steps 608a and 608b measure a difference between adjacent edge buffer elements. Then, deriving a quantized angle from each difference vector in Step 608c includes additional substeps. Step 608c1 converts the difference to a folded offset angle. Step 608c2 converts the folded offset angle to a derived angle.

In some aspects, measuring the difference between adjacent edge buffer elements in Steps 608a and 608b includes measuring the sign of the difference vector. Then, converting the folded offset angle to a derived angle in Step 608c2 includes applying the difference vector sign to the derived angle.

In some aspects, generating a rotation angle in Step 608 includes locating the center of rotation. Locating the center of rotation includes substeps. Step 608h locates first x and first y coordinates for a left-most leading edge. Step 608i locates second x and second y coordinates for a top-most leading edge. Step 608j, if the angle of rotation is negative, uses the first y and x coordinates as the center of rotation. Step 608k, if the angle of rotation is positive, uses the second y and x coordinates as the center of rotation.

Locating first x and first y coordinates for the left-most leading edge in Step 608h includes substeps. Step 608h1 analyzes the row-edge buffer elements to locate the row-edge buffer element associated with the left-most edge. Step 608h2 reads the edge position from the located row-edge buffer element. Likewise, locating second x and second y coordinates for the top-most leading edge in Step 608i includes substeps. Step 608i1 analyzes the column-edge buffer elements to locate the column-edge buffer element associated with the top-most edge. Step 608i2 reads the edge position from the located column-edge buffer element.

In other aspects, comparing adjacent elements of matrix row information to generate a first set of edge positions in Step 604 includes substeps. Step 604c locates a first row-mean buffer element with a leftmost leading edge to determine a first y coordinate. Step 604d locates the column element in the first row-mean buffer element corresponding to the left-most leading edge to determine a first x coordinate. Likewise, comparing adjacent elements of matrix column information to generate a second set of edge positions in Step 606 includes substeps. Step 606c locates a first column-mean buffer element with a top-most leading edge to determine a second x coordinate. Step 606d locates the row element in the first column-mean buffer element corresponding to the top-most leading edge to determine a second y coordinate.

Some aspects of the method include a further step. Step 602a, following the scanning a document to create a matrix of pixel information, down-samples the pixel input data reduce the total number of pixels. In other aspects, Step 602b, following the scanning a document to create a matrix of pixel information, converts pixel color information to pixel grayscale information.

In some aspects a Step 602c predicts pixel information matrix locations likely to be a document edge. Step 602d, following the converting of pixel color information to pixel grayscale information, stretches the range of pixel information grayscale values, for grayscale values near the predicted document edges.

A system and method have been provided for aligning a scanned document in a digital scanner. Examples of the basic methodology have been given, but the invention is not limited to just these examples. Likewise, some specifics have been given with respect to process ordering and particular number choices. Once again, the invention is not limited to merely these specifics. Neither is the invention limited to any particular document shape or scanning function (scanning, copying, storing, transmission, etc.) Other variations and embodiments of the invention will occur to those skilled in the art.

I claim:

1. In a digital scanner, a method for aligning a scanned document, the method comprising:

scanning a document to create a matrix of pixel information;

averaging pixel intensity information into a first plurality of row-mean buffer elements, where each row strip includes information from a second plurality of column elements;

averaging pixel information into a third plurality of column-mean buffer elements, where each column strip includes information from a fourth plurality of row elements;

comparing adjacent elements of matrix row-mean buffer elements to generate a first set of edge positions;

comparing adjacent elements of matrix column-mean buffer elements to generate a second set of edge positions;

generating a rotation angle in response to analyzing the first and second edge positions; and, rotating the scanned document by the rotation angle.

2. The method of claim 1 wherein averaging pixel intensity information into row-mean buffer elements includes each column element having a fifth plurality of pixels; and, wherein averaging pixel intensity information into column-mean buffer elements includes each row element having a sixth plurality of pixels.

3. The method of claim 2 further comprising:

establishing an edge threshold;

wherein comparing adjacent elements in the row-mean buffer elements to generate a first set of edge positions includes:

subtracting a first column element in the row-mean buffer element from an adjacent second column element in the row-mean buffer element; and, if the difference exceeds the threshold, defining the first column element as a first edge position; and, wherein comparing adjacent elements in the column-mean buffer element to generate a second set of edge positions includes:

subtracting a first row element in the column-mean buffer element from an adjacent second row element in the column-mean buffer element; and, if the difference exceeds the threshold, defining the first row element as a second edge position.

4. The method of claim 3 further comprising:

saving the first set of edge positions as binary information in a row-edge buffer with a plurality of elements; and, saving the second set of edge positions as binary information in a column-edge buffer with a plurality of elements.

5. The method of claim 4 wherein generating a rotation angle in response to analyzing the first and second edge positions includes:

calculating a difference vector between edge positions in adjacent row-edge buffer elements;

calculating a difference vector between edge positions in adjacent column-edge buffer elements;

deriving a quantized angle from each difference vector; and, using the most frequently occurring of the derived angles to generate the rotation angle.

6. The method of claim 5 wherein generating a rotation angle in response to analyzing the first and second edge positions includes limiting the rotation angle to a range of 90 degrees.

7. The method of claim 6 wherein limiting the rotation angle to a range of 90 degrees includes:

constraining the range of acceptable derived angles in the range between −45 degrees and +45 degrees;

if a derived angle ($\theta$) is greater than +45 degrees, creating an effective derived angle ($\theta 1$) as follows:

($\theta 1$)=90 degrees−($\theta$);

if a derived angle (θ) is less than −45 degrees, creating an effective derived angle (θ1) as follows:

(θ1)=−(90 degrees+(θ)); and, wherein using the most frequently occurring of the derived angles to generate the rotation angle includes using the most frequently occurring of the effective derived angles to generate the rotation angle.

8. The method of claim 5 wherein calculating a difference vector between edge positions in adjacent edge buffer elements includes measuring the difference between adjacent edge buffer elements;
wherein deriving a quantized angle from each difference vector includes:
converting the difference to a folded offset angle; and,
converting the folded offset angle to a derived angle.

9. The method of claim 8 wherein measuring the difference between adjacent edge buffer elements includes measuring the sign of the difference vector; and,
wherein converting the folded offset angle to a derived angle includes applying the difference vector sign to the derived angle.

10. The method of claim 5 wherein generating a rotation angle in response to analyzing the first and second edge positions further includes locating the center of rotation.

11. The method of claim 10 wherein locating the center of rotation includes:
locating first x and first y coordinates for a left-most leading edge;
locating second x and second y coordinates for a top-most leading edge;
if the angle of rotation is negative, using the first y and x coordinates as the center of rotation; and,
if the angle of rotation is positive, using the second y and x coordinates as the center of rotation.

12. The method of claim 11 wherein locating first x and first y coordinates for the left-most leading edge includes:
analyzing the row-edge buffer elements to locate the row-edge buffer element associated with the left-most edge; and,
reading the edge position from the located row-edge buffer element; and,
wherein locating second x and second y coordinates for the top-most leading edge includes:
analyzing the column-edge buffer elements to locate the column-edge buffer element associated with the top-most edge; and,
reading the edge position from the located column-edge buffer element.

13. The method of claim 11 wherein comparing adjacent elements of matrix row information to generate a first set of edge positions includes:
locating a first row-mean buffer element with a left-most leading edge to determine a first y coordinate; and,
locating the column element in the first row-mean buffer element corresponding to the left-most leading edge to determine a first x coordinate; and,
wherein comparing adjacent elements of matrix column information to generate a second set of edge positions includes:
locating a first column-mean buffer element with a top-most leading edge to determine a second x coordinate; and,
locating the row element in the first column-mean buffer element corresponding to the top-most leading edge to determine a second y coordinate.

14. The method of claim 2 wherein averaging pixel intensity information into row-mean buffer elements includes averaging pixel information from a subset of the fifth plurality of row pixels in each row-mean buffer element; and,
wherein averaging pixel intensity information into column-mean buffer elements includes averaging pixel information from a subset of the sixth plurality of column pixels in each column-mean buffer element.

15. The method of claim 1 further comprising:
following the scanning a document to create a matrix of pixel information, down-sampling the pixel input data reduce the total number of pixels.

16. The method of claim 1 further comprising:
following the scanning a document to create a matrix of pixel information, converting pixel color information to pixel grayscale information.

17. The method of claim 16 further comprising:
predicting pixel information matrix locations likely to be a document edge;
following the converting of pixel color information to pixel grayscale information, stretching the range of pixel information grayscale values, for grayscale values near the predicted document edges.

18. The method of claim 4 further comprising:
for each edge position in the first and second sets, examining neighboring elements; and,
if the neighboring elements are not edge positions, eliminating the edge position.

19. A digital scanner system for aligning a scanned document with a predetermined axis, the system comprising:
a digital scanner having an interface to scan a supplied document and an output to supply a matrix of pixel information;
a first buffer having a port connected to the scanner output to store the matrix of pixel information
an averaging unit having a port connected to the buffer port, the averaging unit comparing adjacent elements of matrix row information to generate a first set of edge positions and comparing adjacent elements of matrix column information to generate a second set of edge positions;
a row-edge buffer having a port connected to the averaging unit to accept the first set of edge positions;
a column-edge buffer having a port connected to the averaging unit to accept the second set of edge positions;
a rotating unit having a port connected to the row-edge and column-edge buffer to generate a rotation angle, in response to analyzing the first and second edge positions, for aligning the matrix of pixel information in the first buffer with a predetermined axis;
wherein the averaging unit averages pixel intensity information into a first plurality of row-mean buffers, where each row includes information from a second plurality of column elements;
wherein the averaging unit averages pixel information into a third plurality of column-mean buffer elements, where each column includes information from a fourth plurality of row elements; and,
wherein the averaging unit compares adjacent column elements in the row-mean buffer elements to generate a first set of edge positions and compares adjacent row elements in the column-mean buffer elements to generate a second set of edge positions.

20. The system of claim 19 wherein the averaging unit averages pixel intensity information into row-mean buffer elements, where each column element has a fifth plurality of pixels; and, wherein the averaging unit averages pixel intensity information into column-mean buffer elements, where each row element has a sixth plurality of pixels.

21. The system of claim 20 wherein the averaging unit establishes an edge threshold, generates a first set of edge positions by subtracting a first column element in the row-mean buffer element from an adjacent second column element in the row-mean buffer element, and if the difference exceeds the threshold, defines the first column element as a first edge position; and, wherein the averaging unit generates a second set of edge positions by subtracting a first row element in the column-mean buffer element from an adjacent second row element in the column-mean buffer element, and if the difference exceeds the threshold, defines the first row element as a second edge position.

22. The system of claim 21 wherein the rotating unit calculates a difference vector between edge positions in adjacent row-edge buffer elements, calculates a difference vector between edge positions in adjacent column-edge buffer elements, derives a quantized angle from each difference vector, and uses the most frequently occurring of the derived angles to generate the rotation angle.

23. The system of claim 22 wherein the rotating unit limits the rotation angle to a range of 90 degrees.

24. The system of claim 23 wherein the rotating unit constrains the range of acceptable derived angles in the range between −45 degrees and +45 degrees, and if a derived angle ($\theta$) is greater than +45 degrees, creates an effective derived angle ($\theta 1$) as follows:

($\theta 1$)=90 degrees−($\theta$); and, if a derived angle ($\theta$) is less than −45 degrees, creates an effective derived angle ($\theta 1$) as follows:

($\theta 1$)=−(90 degrees+($\theta$)); and, wherein the rotating unit uses the most frequently occurring of the effective derived angles to generate the rotation angle.

25. The system of claim 22 wherein the rotating unit measures the difference in offsets between adjacent edge buffer elements, converts the difference to a folded offset angle, and converts the folded offset angle to a derived angle.

26. The system of claim 25 wherein the rotating unit measures the sign of the difference vector and applies the difference vector sign to the derived angle.

27. The system of claim 22 wherein the rotating unit locates the center of rotation in response to analyzing the first and second edge positions.

28. The system of claim 27 wherein the rotating unit locates first x and first y coordinates for a left-most leading edge, locates second x and second y coordinates for a top-most leading edge, and if the angle of rotation is negative, uses the first y and x coordinates as the center of rotation, and if the angle of rotation is positive, uses the second y and x coordinates as the center of rotation.

29. The system of claim 28 wherein the rotating unit locates the first x and first y coordinates for the left-most edge by analyzing the row-edge buffer elements to locate the row-edge buffer element associated with the left-most edge; and, wherein the rotating unit locates second x and second y coordinates for the top-most leading edge by analyzing the column-edge buffer elements to locate the column-edge buffer element associated with the top-most edge.

30. The system of claim 28 wherein the rotating unit generates the first set of edge positions by locating a first row-mean buffer element with a left-most leading edge to determine a first y coordinate and locating the column element in the first row-mean buffer element corresponding to the left-most leading edge to determine a first x coordinate; and, wherein the rotating unit generates the second set of edge positions by locating a first column-mean buffer element with a top-most leading edge to determine a second x coordinate and locating the row element in the first column-mean buffer element corresponding to the top-most leading edge to determine a second y coordinate.

31. The system of claim 20 wherein the averaging unit averages pixel information from a subset of the fifth plurality of pixels in each row-mean buffer element and averages pixel information from a subset of the sixth plurality of pixels in each column-mean buffer element.

32. The system of claim 19 further comprising:

a sampling unit connected to the output of the scanner to accept pixel information and an output connected to the first buffer to supply down-sampled pixel data, to reduce the total number of pixels stored in the first buffer.

33. The system of claim 19 further comprising:

a converting unit having an input connected to the scanner output and an output connected to the first buffer to supply pixel color information converted to pixel grayscale information.

34. The system of claim 33 further comprising:

a predicting unit having an input connected to the scanner output and an output connected to the converter input for supplying pixel information matrix locations in the first buffer likely to be a document edge; and, wherein the converting unit stretches the range of pixel information grayscale values, for grayscale values stored in the first buffer near the predicted document edges.

35. The system of claim 21 wherein the averaging unit examines neighboring elements for each edge position in the first and second sets, and if the neighboring elements are not edge positions, eliminates the edge positions as noise.

* * * * *